(12) United States Patent
Satow et al.

(10) Patent No.: US 11,029,905 B2
(45) Date of Patent: *Jun. 8, 2021

(54) INTEGRATED LEARNING USING MULTIPLE DEVICES

(71) Applicant: SAP SE, Walldorf (DE)

(72) Inventors: Lars Satow, Markdorf (DE); Joerg Habon, Tettnang (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,932

(22) Filed: Nov. 26, 2019

(65) Prior Publication Data

US 2020/0097240 A1 Mar. 26, 2020

Related U.S. Application Data

(63) Continuation of application No. 15/411,735, filed on Jan. 20, 2017, now Pat. No. 10,521,176, which is a continuation of application No. 13/928,072, filed on Jun. 26, 2013, now Pat. No. 9,588,654.

(51) Int. Cl.
| | | |
|---|---|---|
| *G06F 3/14* | (2006.01) | |
| *G06F 3/0484* | (2013.01) | |
| *G09B 5/02* | (2006.01) | |
| *G06F 3/01* | (2006.01) | |
| *G06F 3/03* | (2006.01) | |
| *G06F 9/451* | (2018.01) | |
| *G06K 7/10* | (2006.01) | |

(52) U.S. Cl.
CPC ............ *G06F 3/14* (2013.01); *G06F 3/011* (2013.01); *G06F 3/03* (2013.01); *G06F 3/0304* (2013.01); *G06F 3/0484* (2013.01); *G06F 3/1423* (2013.01); *G06F 9/453* (2018.02); *G06K 7/1092* (2013.01); *G09B 5/02* (2013.01); *G09G 2354/00* (2013.01)

(58) Field of Classification Search
CPC . G06F 3/14; G06F 9/453; G06F 3/011; G06F 3/03
See application file for complete search history.

(56) References Cited

U.S. PATENT DOCUMENTS

| | | | | |
|---|---|---|---|---|
| 8,752,758 | B1 * | 6/2014 | Klebe | G01G 23/01 235/375 |
| 2003/0204812 | A1 * | 10/2003 | Hayashi | H04N 1/32341 715/255 |
| 2006/0244995 | A1 * | 11/2006 | Kushida | G06F 3/1259 358/1.15 |
| 2013/0007183 | A1 * | 1/2013 | Sorenson, III | G06F 8/65 709/213 |
| 2013/0110607 | A1 * | 5/2013 | Basmajian | G06Q 30/0238 705/14.26 |

(Continued)

*Primary Examiner* — David E Choi
(74) *Attorney, Agent, or Firm* — Fountainhead Law Group P.C.

(57) ABSTRACT

An access code can be generated by a primary device and interpreted by a secondary device for the purpose of presenting, on the secondary device, additional content related to an application running on the primary device. The access code can be a two dimensional graphic or QR code that can be easily captured by a camera unit of the secondary device. Once captured, additional content related to the running application can be identified and displayed on the secondary device.

20 Claims, 6 Drawing Sheets

(56) References Cited

U.S. PATENT DOCUMENTS

| | | | |
|---|---|---|---|
| 2013/0112760 A1* | 5/2013 | Schory | G06K 19/06112 235/494 |
| 2013/0159179 A1* | 6/2013 | Choi | G06Q 20/3674 705/41 |
| 2013/0188095 A1* | 7/2013 | Hartson | H04N 5/44513 348/589 |
| 2013/0219295 A1* | 8/2013 | Feldman | G06Q 10/101 715/751 |
| 2014/0085309 A1* | 3/2014 | Czapar | G06F 3/147 345/441 |
| 2014/0123056 A1* | 5/2014 | Puranik | G06Q 30/06 715/780 |
| 2014/0214570 A1* | 7/2014 | Smolev | G06Q 30/0282 705/21 |
| 2014/0281855 A1* | 9/2014 | Bhatnagar | G06F 16/9554 715/205 |
| 2014/0319210 A1* | 10/2014 | Angus | G07F 19/209 235/379 |
| 2014/0372427 A1* | 12/2014 | Lehmann | G06F 16/583 707/736 |
| 2015/0007026 A1* | 1/2015 | Satow | G06K 7/1092 715/708 |
| 2015/0007054 A1* | 1/2015 | Qu | H04L 65/4053 715/753 |

\* cited by examiner

INTEGRATED LEARNING USING MULTIPLE DEVICES

CROSS REFERENCES TO RELATED APPLICATIONS

This application is a continuation of U.S. patent application Ser. No. 15/411,735 filed Jan. 20, 2017, which is a continuation of U.S. patent application Ser. No. 13/928,072 filed Jun. 26, 2013. The entire contents of U.S. patent application Ser. No. 13/928,072 and U.S. patent application Ser. No. 15/411,735 are incorporated herein by reference in its entirety for all purposes.

BACKGROUND

Unless otherwise indicated herein, the approaches described in this section are not prior art to the claims in this application and are not admitted to be prior art by inclusion in this section.

Software applications traditionally include built-in support features. The support features provide instructions on how to use the application and how to troubleshoot problems that may arise during use of the application. To utilize the built-in support features, a user selects a topic or problem from a predefined list. Once selected, the selected topic or solution to the selected problem is presented on the display. The user may spend an unnecessary amount of time navigating through different topics in search of the desired topic or solution. Furthermore, the support features are often presented to the user in a new window that overlays application content, thus preventing the user from viewing the application content that is already present on the display.

SUMMARY

Embodiments of the present invention improve integrated learning using multiple devices. In one embodiment the present invention includes a system that includes a first device including an access code generator configured to generate an access code according to the context of an application running on the first device, wherein the access code is presented on a first display belonging to the first device, and a second device including a camera configured to capture the access code from the first display and a decoder configured to identify additional content related to the application based on the access code for presentation on a second display belonging to the second device. The additional content may be stored on the second device. Alternatively, the additional content can be downloaded from a remote server. The access code can be an invisible watermark. The access code can also be any two-dimensional graphic, including a Quick Response code. The additional content can be displayed on the second device while the application is running on the first device.

In another embodiment, the present invention includes a method that includes collecting, by a computer, application metadata describing a current state of an application, generating, by the computer, an access code according to the application metadata, and presenting, by the computer, the access code on a display, wherein the access code is configured to identify additional content that is associated with the current state of the application. The method can be performed in response to detecting a help event from the application. The help event can be associated with an error generated during execution of the application. The access code can also include a plurality of fields configured to store application metadata. The access code can also include an identifier configured to uniquely identify the additional content. The access code can optionally be an invisible digital watermark or a two-dimensional visible graphic.

The following detailed description and accompanying drawings provide a better understanding of the nature and advantages of the present invention.

DETAILED DESCRIPTION

Described herein are techniques for integrated learning using multiple devices. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A system is described for providing an integrated learning environment. The system includes one or more mobile devices that are configured to provide support for an application running on a primary device through the presentation of additional content. For example, additional content can be presented on the one or more mobile devices while the application is running on the primary device to enhance the user's experience of the application. By presenting the additional content on another device, the user can consume additional content related to the application running on the primary device while minimizing changes to the visibility of content presented on the primary device. This creates a more user-friendly environment to receive supplemental content related to the application or to troubleshoot the application. The additional content can include videos, audio, and text, to name a few.

Generally, the additional content is related to the current state of the application running on the primary device. For example, a user may be in the process of creating a spreadsheet. While creating the spreadsheet, the user may be unclear on how to enter an equation for a field within the spreadsheet. A user request for help on this topic can be processed and handled by a mobile device other than the primary device. In other words, the additional content can include supplemental information related to the context of an application running on the primary device or an action being performed on the primary device. Advantages of the integrated learning environment include the ability to provide additional content to the user without obstructing the visibility of application content currently being displayed on the primary device. Another advantage is that additional content can be stored at a location than the primary device, thus maximizing the available disk space on the primary device.

Figure 1:
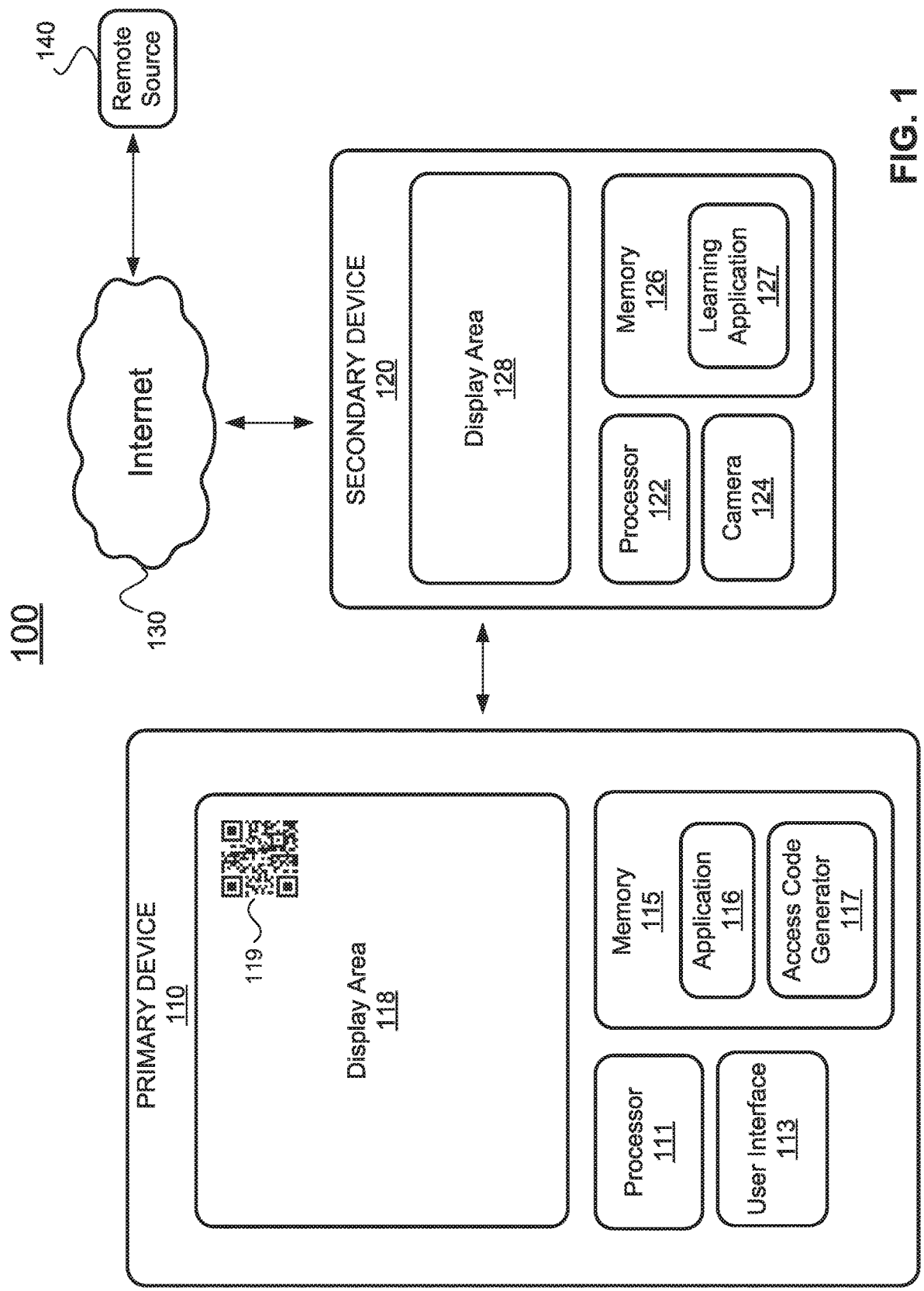
FIG. 1 illustrates an exemplary high level system diagram of an integrated learning environment.

FIG. 1 illustrates an exemplary high level system diagram of an integrated learning environment. System 100 includes primary device 110 and secondary device 120. In other examples, more than one secondary device can exist. Secondary device 120 can be used to supplement the information being presented on primary device 110. For example, secondary device 120 can display additional content relevant to an application running on primary device 110. In some embodiments, secondary device 120 can select the additional content according to an access code received from primary device 110.

As shown in FIG. 1, primary device 110 includes processor 111, user interface 113, memory 115, and display area 118. Processor 111 can be configured to execute application module 116 stored in memory 115. As the application is being executed, display area 118 can provide an output interface for the application while user interface 113 can provide an input interface for the application. In some examples, the user interface can include a touchpad, a keyboard, a microphone, or a camera. In other examples, a touch sensitive display can replace display area 118 and user interface 113.

Memory 115 also stores access code generator module 117. Access code generator module 117 can be configured to generate an access code. The access code can be received on a secondary device and processed to identify additional content to be presented to the user. Access code 119 can be generated according to the current state of the application being executed by processor 111. For instance, access code generator module 117 can be executed when processor 111 detects a help event during execution of the application. In one embodiment, the help event can be triggered upon detection of an error during execution of the application. For example, the error can be due to improper user input or a crash in the application that prevents the application from functioning properly. In another embodiment, the help event can be triggered through a user request received from the input interface. For example, a user can request additional information relating to content being presented on display area 118 of primary device 110. This request can trigger the creation of the access code 119.

Access code generator module 117 can also be configured to present access code 119 on display area 118. In one embodiment, access code 119 can be a visible two dimensional graphic. Exemplary two dimensional graphics include bar codes, QR codes, text strings, and images. In another embodiment, access code 119 can be a digital watermark. The digital watermark can be substantially invisible to the naked eye but detectable by camera 124 of secondary device 120. In one example, the digital watermark is dynamically embedded into the application content being presented on display area 118. Thus, the digital watermark is being displayed simultaneously with the application content without disturbing the user's view of the application content. In other examples, the access code can be some other digital signature, such as an audible noise that can be captured by secondary device 120.

Secondary device 120 is configured to capture access code 119 from display area 118 of primary device 110, identify the desired additional content based on the captured access code 119, and present the additional content. Secondary device 120 includes processor 122. Processor 122 is configured to execute modules stored in memory 126. Here, processor 122 can execute learning application module 127 stored in memory 126. The learning application module 127 can provide the instructions to capture access code 119 using camera 123, to determine the desired additional content from captured access code 119, and to present the desired additional content on display area 128. In one embodiment, learning application module 127 includes a decoding module to decode access code 119 into data about application 116 (such as attributes of the application or the current state of the application) that can be used to identify the desired additional content.

In one embodiment, the desired additional content can be stored in memory 126. Thus, the desired additional content to be presented on display area 128 can be selected from a predefined set of content stored within memory 126. In another embodiment, the desired additional content can be requested from remote source 140. Secondary device 120 can communicate with remote source 140 through internet 130. The communications can include a request for the desired additional content and a payload containing the desired additional content. In yet another embodiment, a portion of the desired additional content can be sourced from memory 126 while another portion of the desired additional content can be sourced from remote source 140. For example, content that is more frequently accessed can be stored in memory 126 while other content is stored at remote source 140. The frequency that content is accessed can be measured according to the usage of a particular user or alternatively from the usage of a group of users. In some examples, the distribution of the additional content stored in memory 126 and remote source 140 can be updated due to changes in the popularity of the content. The distribution can be updated based on a predefined schedule. Alternatively, the distribution can be updated dynamically when the distribution has changed more than a predefined threshold.

In one embodiment, a portion of display area 118 can be dedicated to the display of an access code. As the context of the application changes, access code generator 117 can update the access code displayed. This allows the access code displayed to be related to the current context of the application. If the user is interested in receiving assistance or more information related to the current application context, the user can use the secondary device to capture the access code. Supplemental information or support related to the current application context can then be presented on the secondary device.

Figure 2:
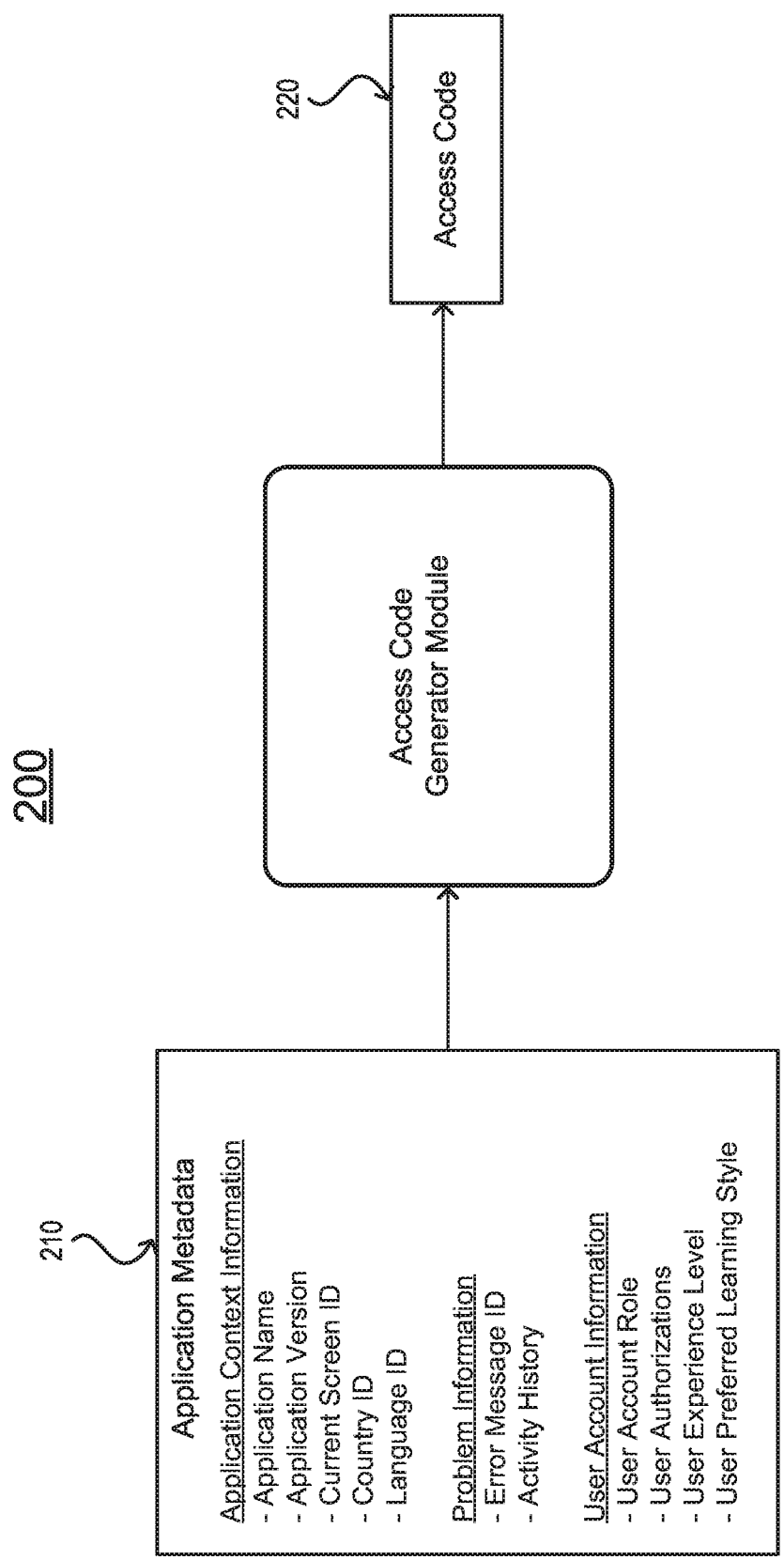
FIG. 2 illustrates an exemplary access code generator module.

FIG. 2 illustrates an exemplary access code generator module. Access code generator module 200 can receive application metadata 210 from an application running on a device. For example when a help event is generated, the application can collect information related to the application, package the information as application metadata 210, and transmit application metadata 210 to access code generator module 200. Alternatively, access code generator module 200 can send requests to the application for desired application metadata. In one embodiment, the requests can be based off of intelligent logic. For example, access code generator module 200 can request application name. If only one version of the application exists, then access code generator module 200 can automatically fill in the application version rather than sending a request for the application version. This can minimize the amount of information that is collected from the application.

The access code generator module 200 can process application metadata 210 to generate access code 220. In one embodiment, access code 220 can include a plurality of fields for transmitting application metadata to another device. Generation of the access code 220 can include mapping application metadata 210 into fields of access code 220. The mapping process can be reversible, thus allowing application metadata 210 to be deciphered from access code 220 at a later point in time. In one example, a field may be configured to store application name while another field is configured to store error message ID. Once the metadata is mapped into fields of access code 220, a conversion process can be executed to generate a digital watermark or two dimensional graphic which can be presented on a display as a simple means of transmitting the application metadata to another device.

In another embodiment, access code 220 can serve to identify the additional content that is to be displayed on the other device. Access code generator module 200 can identify an access code from a plurality predefined access codes based on received application metadata 210. For example, application metadata 210 can be analyzed by access code generator module 200 to identify additional content to be displayed on a secondary device. A predefined access code associated with the desired additional content can be selected from a plurality of predefined access codes and output from access code generator module 200. Capture of access code 220 on another device would explicitly identify the desired additional content to be displayed. In some examples, the access code can include an identifier that is uniquely associated with the desired additional content Application metadata 210 can include application context information. Application context information includes details that describe the context of the application, such as the application name, application version, current screen ID, country ID, and language ID. The application context information can be used to identify the particular version of the application and the current state of the application when the application metadata was collected. This information can be used to identify additional content that is relevant to the application. Application metadata 210 can also include problem information. Problem information can include error message ID and activity history. The error message and activity history can be used to identify an encountered issue. Depending on the issue, particular solutions can be offered. Application metadata 210 can also include user account information. User account information includes user account role, user authorizations, user experience level, and user preferred learning style. Depending on the user account information, the additional content can be presented in varying formats or detail. For example, a user with authorization for the entire suite of additional content with a low experience level can desire content that is not technical. As another example, if the user's preferred learning style is video instead of text and images and the user authorizations include the video format of the solution, a video can be presented on the secondary device.

The application context can change according to the user's experience with the application. The access code can also change according to the application context during use of the application. In some examples, changes in the application context can affect the access code generated and in turn the type of supplemental information that is presented on the secondary device. For example, a help request submitted during use of the application can result in the generation of an access code for presenting help information on the secondary device. In contrast, an interrupt or error that is detected can result in the generation of an access code for providing additional details relating to the interrupt or error. This can assist a user in troubleshooting and finding the cause of the interrupt or error. In yet other examples, the access code can change according to what information is being displayed on the primary device or what the action the user is performing on the primary device.

Figure 3:
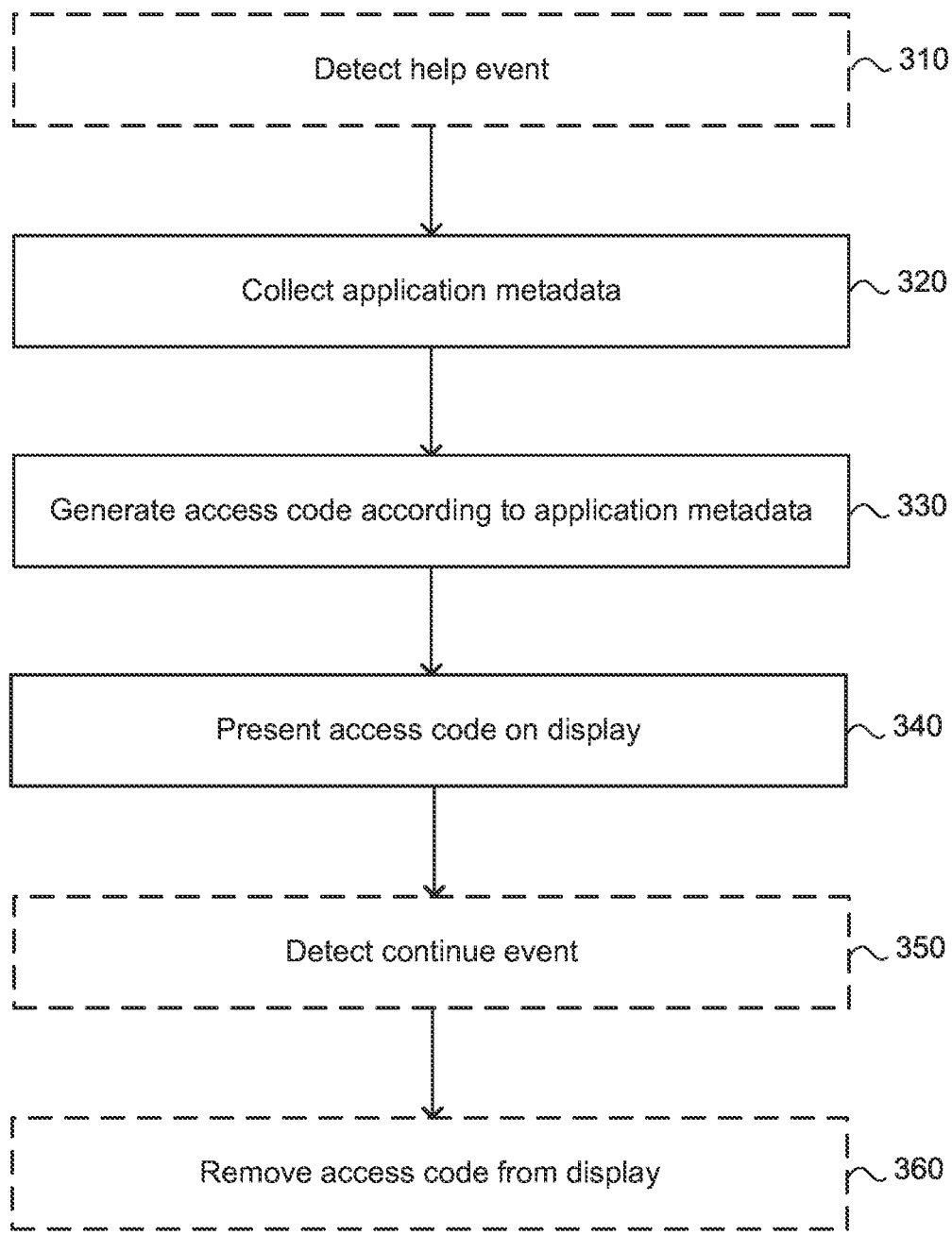
FIG. 3 illustrates an exemplary method to generate and present an access code.

FIG. 3 illustrates an exemplary method to generate and present an access code on a display. Process 300 can be performed by a device such as primary device 110 as described in FIG. 1. Process 300 can begin by collecting application metadata at 320. The application metadata can be received or retrieved through a series of submitted queries. In one embodiment, the metadata collection can be triggered when a help event is detected at 310. In some examples, the help event can be triggered by user interaction or an error that occurs during execution of the application.

Once the application metadata is collected, process 300 can continue by generating the access code according to the application metadata at 330. In one example, the access code can contain information related to the current state of the application. In another example, the access code can contain information related to the desired additional content to be displayed on another device. In yet another example, the access code can contain a combination of the above. Once the access code is generated, it is presented on the display at 340. The access code can be presented as a two-dimensional graphic such as a barcode or QR code. Alternatively, the access code can be presented as a digital watermark.

Optionally, the access code can be subsequently removed after being presented on the display. Here, a continue event is optionally detected at 350. In one example, the continue event can be triggered after the access code has been displayed for a predefined period of time. In another example, the continue event can be triggered when the application receives a signal from another device indicating that the access code has been received. In yet another example, the continue event can be triggered when an instruction is received to remove the access code or to perform a task in the application. Once the continue event is detected, the access code is removed from the display at 360.

Figure 4:
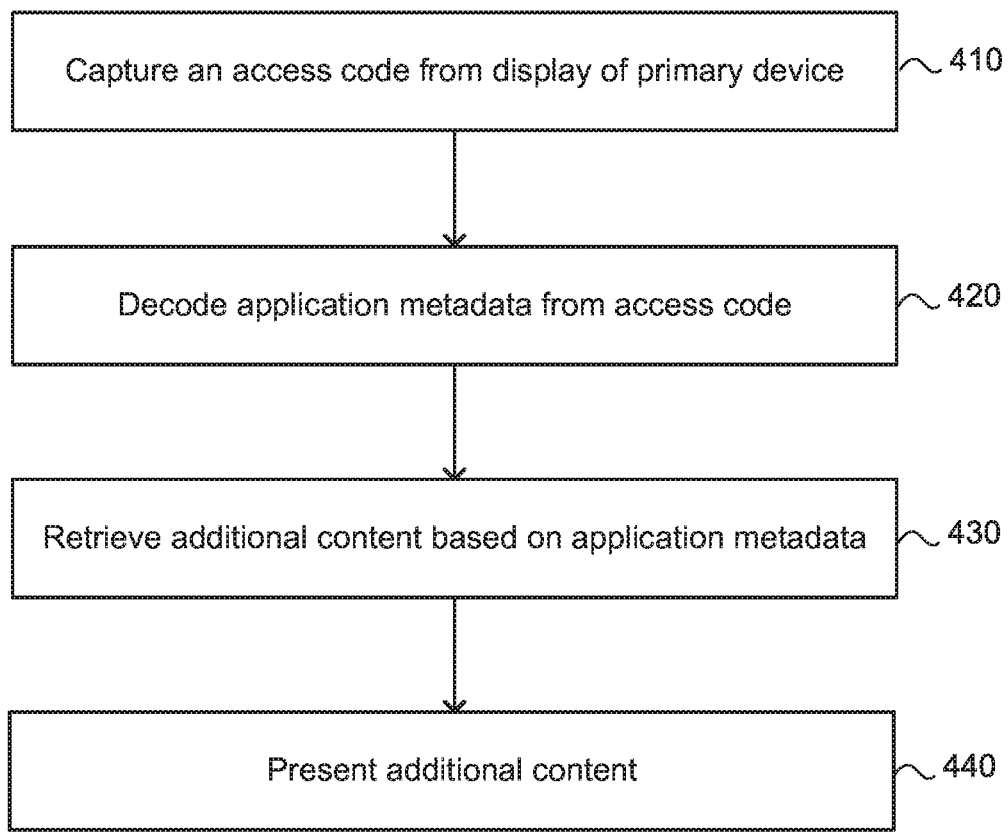
FIG. 4 illustrates an exemplary method to retrieve additional content through the use of an access code.

FIG. 4 illustrates an exemplary method to retrieve additional content through the use of an access code. Process 400 can be performed by a mobile device such as secondary device 120 of FIG. 1. Process 400 begins by capturing an access code from a display of a primary device. The access code can be captured through a camera unit or other image capture device. Alternatively, the access code can be captured through other input means such as a microphone if the access code is an audible signature. In some examples, the primary device may be similar or substantially similar to primary device 110 of FIG. 1. Once the access code has been captured, application metadata is decoded from the access code at 420. The application metadata can include information related to the application running on the primary device, such as application properties or the current state of the application. Application metadata can also include data identifying information to be presented to the user. For example, the application metadata can identify a particular video or piece of text that is to be presented. The identified information can be stored on the device executing process 400 or alternatively be stored at a remote location.

Once the application metadata has been decoded, additional content can be retrieved based on the application metadata at 430. If the application metadata identifies one or more pieces of additional content, the identified additional content can be retrieved. If the application metadata includes information about an application running on the primary device, the application metadata can be analyzed to identify additional content. The additional content can then be retrieved from local storage or from a remote location. Once retrieved, the additional content can be presented at 440. In some examples, the additional content is presented on a display at the same time as primary content is being presented on a display of the primary device.

Figure 5:
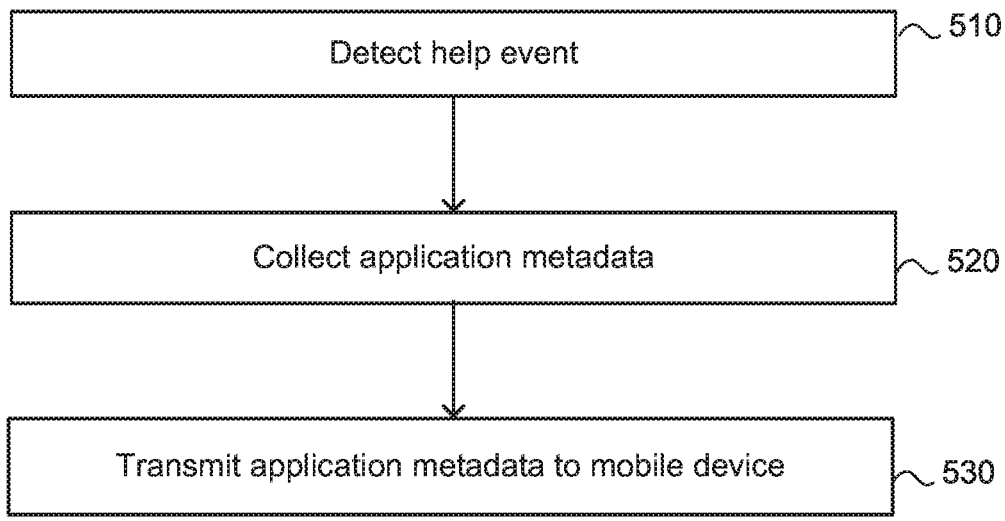
FIG. 5 illustrates an exemplary method to respond to a help event.
Figure 6:
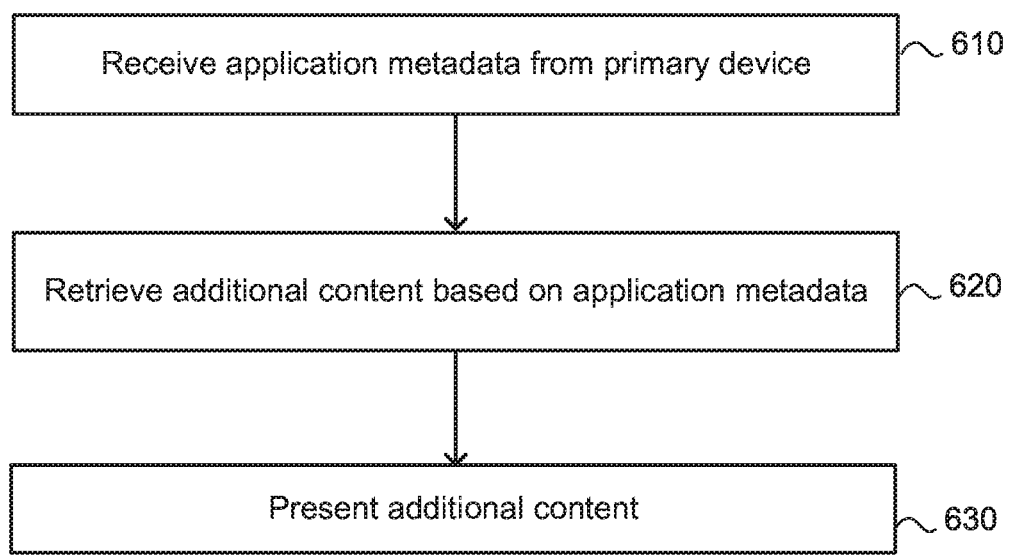
FIG. 6 illustrates an exemplary method to retrieve additional content.

In other embodiments of the present invention, the primary device can communicate with one or more secondary devices through other means than visually capturing the access code presented on the display. For example, the primary device can communicate with the secondary device through wired or wireless communication mediums such as Bluetooth, Wi-Fi, local area networks, and wide area networks. FIGS. 5 and 6 illustrate an example of the devices communicating with one another through a wireless communication medium.

FIG. 5 illustrates an exemplary method to respond to a help event. Process 500 can be performed on a device such as primary device 110 of FIG. 1. Process 500 begins by detecting a help event at 410. The help event can be similar or substantially similar to the help event described in FIG. 3. Once the help event has been detected, application metadata can be collected at 520. Collection of the application metadata can be similar or substantially similar as described in FIG. 3. After the application metadata has been collected from the application, the application metadata can be transmitted to a mobile device at 530. Transmission of the application metadata can be through a wired or wireless transmission medium. In some examples, an initialization procedure is performed to establish a relationship between two devices. In other examples, a syncing procedure is performed prior to transmission of the application metadata. The syncing procedure can include broadcasting a signal to other mobile devices to shortly before transmission of the application metadata.

FIG. 6 illustrates an exemplary method to present additional content. Process 600 can be performed by a mobile device such as secondary device 120 of FIG. 1. Process 600 begins by receiving application metadata from a primary device at 610. The application metadata can be received via a wired or wireless communication medium. In some examples, a broadcast signal can be received prior to receiving the application metadata to allow a device to prepare to receive the application metadata. The application metadata can include specific additional audio or visual content to be presented to the user. Alternatively, the application metadata can include attributes related to the current state of an application running on the primary device. Once the application metadata is received, additional content can be retrieved based on the application metadata at 620. The additional content can then be presented through an output component, such as a display or speaker at 630.

Figure 7:
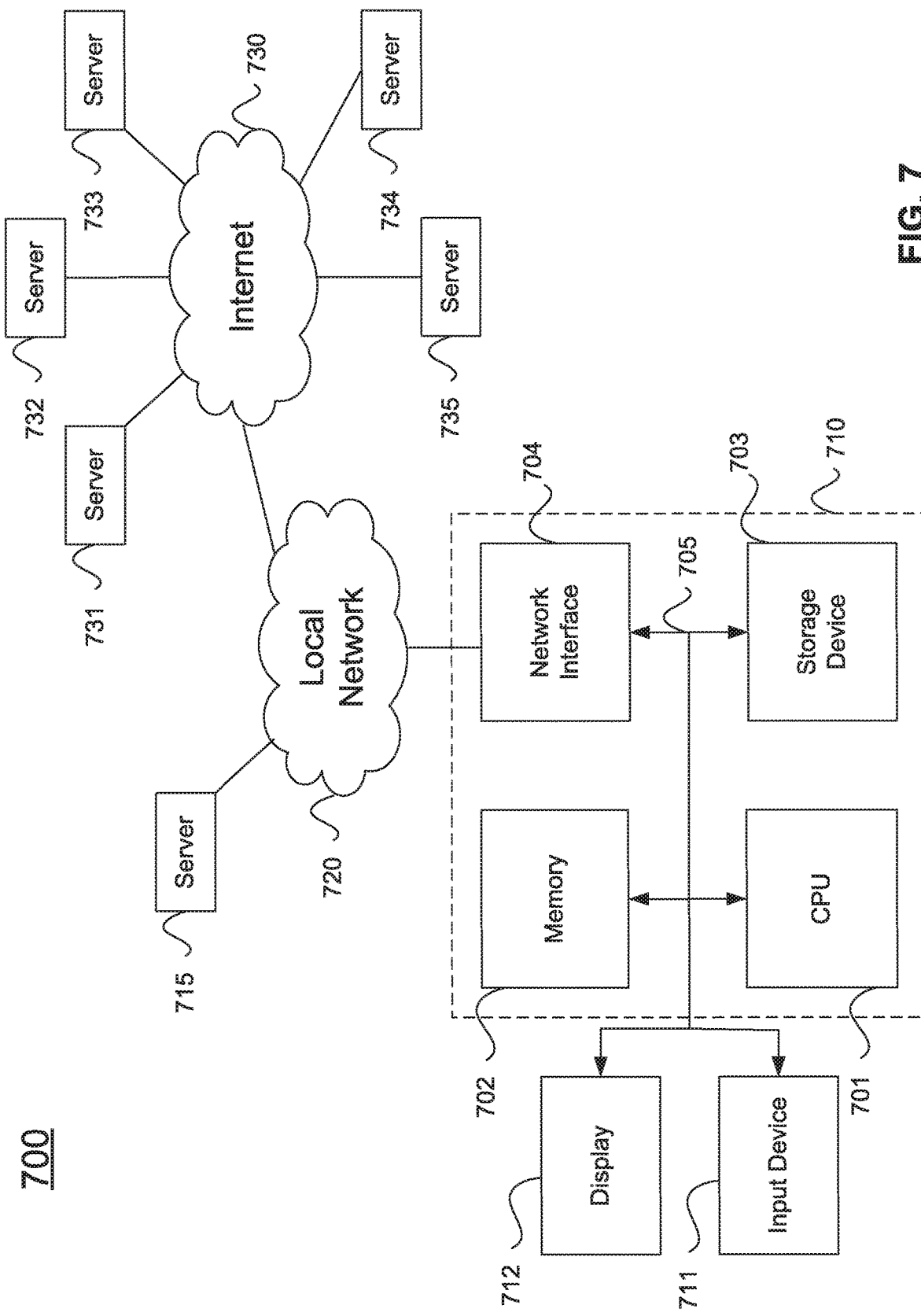
FIG. 7 illustrates an exemplary computer system.

An exemplary computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   capturing, by a first computing device, an access code generated by and presented on a display of a second computing device;
   based on the access code, decoding, by the first computing device, application metadata describing a current state of an application operating on the second computing device, wherein the application metadata is collected by the second computing device in response to the second computing device detecting a help event triggered while application content is being displayed and interacted with on a display of the second computing device, wherein the application metadata identifies the application;

retrieving, by the first computing device, additional application content based on an identification of the application and the current state of the application, the additional application content is related to assisting a user with the application; and presenting, by the first computing device, the additional content on the display of the first computing device.

2. The computer-implemented method of claim 1, wherein the help event is associated with an error generated during execution of the application.

3. The computer-implemented method of claim 1, wherein the access code includes a plurality of fields configured to store application metadata.

4. The computer-implemented method of claim 1, wherein retrieving the additional application content comprises retrieving the additional content from a storage of the first computing device.

5. The computer-implemented method of claim 4, wherein the additional application content is presented on the display of the first computing device at the same time as the application content is being presented on the display of the second computing device.

6. The computer-implemented method of claim 1 further comprising sending, by the first computing device, a signal to the second computing device indicating that the first computing device has read the access code displayed on the display of the second computing device.

7. The computer-implemented method of claim 1, wherein the access code is an audible noise outputted by the second computing device through a speaker of the second computing device, wherein capturing the access code comprises using a microphone of the first computing device to capture the access code.

8. A non-transitory computer readable storage medium storing a program executable by at least one processing unit of a first computing device, the programs comprising sets of instructions for:

capturing an access code generated by and presented on a display of a second computing device;

based on the access code, decoding application metadata describing a current state of an application operating on the second computing device, wherein the application metadata is collected by the second computing device in response to the second computing device detecting a help event triggered while application content is being displayed and interacted with on a display of the second computing device, wherein the application metadata identifies the application;

retrieving additional application content based on an identification of the application and the current state of the application, the additional application content is related to assisting a user with the application; and presenting the additional content on the display of the first computing device.

9. The non-transitory computer readable storage medium of claim 8, wherein the help event is associated with an error generated during execution of the application.

10. The non-transitory computer readable storage medium of claim 8, wherein the access code includes a plurality of fields configured to store application metadata.

11. The non-transitory computer readable storage medium of claim 8, wherein retrieving the additional application content comprises retrieving the additional content from a storage of the first computing device.

12. The non-transitory computer readable storage medium of claim 11, wherein the additional application content is presented on the display of the first computing device at the same time as the application content is being presented on the display of the second computing device.

13. The non-transitory computer readable storage medium of claim 8, wherein the program further comprises a set of instructions for sending a signal to the second computing device indicating that the first computing device has read the access code displayed on the display of the second computing device.

14. The non-transitory computer readable storage medium of claim 8, wherein the access code is an audible noise outputted by the second computing device through a speaker of the second computing device, wherein capturing the access code comprises using a microphone of the first computing device to capture the access code.

15. A system comprising
a first display;
a set of processing units; and
a non-transitory computer-readable medium storing instructions that when executed by at least one processing unit in the set of processing units cause the at least one processing unit to:

capture an access code generated by and presented on a display of a second computing device;

based on the access code, decode application metadata describing a current state of an application operating on the second computing device, wherein the application metadata is collected by the second computing device in response to the second computing device detecting a help event triggered while application content is being displayed and interacted with on a display of the second computing device, wherein the application metadata identifies the application;

retrieve additional application content based on an identification of the application and the current state of the application, the additional application content is related to assisting a user with the application; and present the additional content on the display of the first computing device.

16. The system of claim 15, wherein the access code includes a plurality of fields configured to store application metadata.

17. The system of claim 15, wherein retrieving the additional application content comprises retrieving the additional content from a storage of the first computing device.

18. The system of claim 17, wherein the additional application content is presented on the display of the first computing device at the same time as the application content is being presented on the display of the second computing device.

19. The system of claim 15, wherein the instructions further cause the at least one processing unit to send a signal to the second computing device indicating that the first computing device has read the access code displayed on the display of the second computing device.

20. The system of claim 15, wherein the access code is an audible noise outputted by the second computing device through a speaker of the second computing device, wherein capturing the access code comprises using a microphone of the first computing device to capture the access code.

* * * * *